United States Patent
Albrecht et al.

(10) Patent No.: US 11,333,482 B2
(45) Date of Patent: May 17, 2022

(54) METHOD FOR TRAVEL-SENSING, TRAVEL-SENSING ARRANGEMENT AND BRAKE SYSTEM

(71) Applicant: Continental Teves AG & Co. OHG, Frankfurt am Main (DE)

(72) Inventors: Veit Albrecht, Heusenstamm (DE); Volker Schardt, Frickhofen (DE); Jens Habig, Kronberg (DE); Benjamin Hütter, Frankfurt am Main (DE); Christian Burgdorf, Offenbach (DE); Wolfgang Fritz, Gießen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 57 days.

(21) Appl. No.: 16/928,871

(22) Filed: Jul. 14, 2020

(65) Prior Publication Data

US 2020/0340795 A1    Oct. 29, 2020

Related U.S. Application Data

(63) Continuation of application No. PCT/EP2019/050570, filed on Jan. 10, 2019.

(30) Foreign Application Priority Data

Jan. 15, 2018   (DE) ..................... 10 2018 200 601.6
Jan. 9, 2019    (DE) ..................... 10 2019 200 183.1

(51) Int. Cl.
*G01B 7/30*   (2006.01)
*B60T 8/40*   (2006.01)
*G01D 5/14*   (2006.01)

(52) U.S. Cl.
CPC .............. *G01B 7/30* (2013.01); *B60T 8/4086* (2013.01); *G01D 5/145* (2013.01); *B60T 2220/04* (2013.01)

(58) Field of Classification Search
CPC ................ G01D 5/145; G01D 2205/90; B60T 2220/04; B60T 8/4086; G01B 7/30
See application file for complete search history.

(56) References Cited

U.S. PATENT DOCUMENTS

| | | |
|---|---|---|
| 2009/0210124 A1 | 8/2009 | Schonlau et al. |
| 2011/0043193 A1 | 2/2011 | Aebi et al. |

(Continued)

FOREIGN PATENT DOCUMENTS

| | | |
|---|---|---|
| CN | 102686979 A | 9/2012 |
| CN | 104220844 A | 12/2014 |

(Continued)

OTHER PUBLICATIONS

Japanese Office Action dated May 20, 2020 for the corresponding Japanese Patent Application No. 2020-535978.

(Continued)

*Primary Examiner* — Alesa Allgood

(57) ABSTRACT

A method for sensing travel by a travel-sensing arrangement for a brake system, wherein the travel-sensing arrangement has a first magnetic angle sensor, and the method includes determining a first field strength in a first direction and determining a second field strength in a second direction by the first angle sensor, wherein the travel-sensing arrangement has a second magnetic angle sensor which is arranged at a predetermined distance from the first angle sensor, and the method further includes determining a first field strength in a first direction and determining a second field strength in a second direction by the second angle sensor. A travel-sensing arrangement, to a brake system having a travel-sensing arrangement, to a motor-vehicle and to a use of the travel-sensing arrangement and the method in a brake system.

6 Claims, 1 Drawing Sheet

(56) References Cited

U.S. PATENT DOCUMENTS

| | | |
|---|---|---|
| 2012/0161755 A1 | 6/2012 | Arlot |
| 2013/0024156 A1 | 1/2013 | Servel |
| 2014/0097835 A1* | 4/2014 | Sartee .................. G01R 33/07 324/251 |
| 2015/0081246 A1 | 3/2015 | Schaaf |
| 2015/0219472 A1 | 8/2015 | Ausserlechner |
| 2016/0011010 A1 | 1/2016 | Mothers |
| 2016/0016567 A1 | 1/2016 | Juergens |
| 2017/0108354 A1 | 4/2017 | Maiterth et al. |
| 2017/0234703 A1 | 8/2017 | Acker |
| 2017/0356967 A1* | 12/2017 | Romero .................. G01P 21/02 |

FOREIGN PATENT DOCUMENTS

| | | |
|---|---|---|
| CN | 104833305 A | 8/2015 |
| CN | 107076578 A | 8/2017 |
| DE | 10010042 A1 | 7/2001 |
| DE | 10114043 A1 | 6/2002 |
| DE | 102004058875 A1 | 8/2005 |
| DE | 102007047547 A1 | 4/2009 |
| DE | 102013202350 A1 | 8/2014 |
| DE | 102014109693 A1 | 1/2016 |
| JP | H09231889 A | 9/1997 |
| JP | 2003167627 * | 6/2003 .............. G01B 7/00 |
| JP | 2003167627 A | 6/2003 |
| JP | 2014531283 A | 11/2014 |
| JP | 2015145816 A | 8/2015 |
| JP | 2016075686 A | 5/2016 |
| KR | 20150039213 A | 4/2015 |
| WO | 2009/121193 A1 | 10/2009 |

OTHER PUBLICATIONS

Chinese Office Action dated Aug. 2, 2021 for the counterpart Chinese Patent Application No. 201980008405.0.

Japanese Decision to Grant dated Sep. 29, 2021 for the corresponding Japanese Patent Application No. 2020-535978.

Korean Office Action dated Oct. 29, 2021 for the counterpart Korean Patent Application No. 10-2020-7019827.

* cited by examiner

METHOD FOR TRAVEL-SENSING, TRAVEL-SENSING ARRANGEMENT AND BRAKE SYSTEM

CROSS REFERENCE TO RELATED APPLICATIONS

This application claims priority to PCT International Application No. PCT/EP2019/050570 filed Jan. 10, 2019, which claims priority to German Patent Application Nos. DE 10 2018 200 601.6, filed Jan. 15, 2019 and DE 10 2019 200 183.1, filed Jan. 9, 2019, wherein the contents of such applications are incorporated herein by reference.

TECHNICAL FIELD

A method for sensing travel and a travel-sensing arrangement.

TECHNICAL BACKGROUND

Travel sensors which have the purpose of sensing the activation travel of a brake rod, which are integrated into a brake control unit and which are usually based on an inductive principle or on the principle of a magnetic angle sensor.

The disadvantage of sensors according to the inductive principle is that the sensor always has to be longer than the length of the travel to be measured, and, when a wound transformer is used, the sensor is expensive and complicated to produce.

With respect to sensors based on the principle of the magnetic angle sensor, in the prior art, it is known to use two-dimensional Hall sensors. These sensors respectively measure the field strength in the X direction and Y direction and are, as a result, able to measure an angle of 360°. In contrast, unidimensional Hall sensors are limited to an angle of 180°. The field angle can be calculated from the field strengths of the X direction and of the Z direction by the arc tangent.

The disadvantage of the two principles is that they are not sufficiently robust against magnetic interference fields.

What is needed is to make available a travel-sensing arrangement which has improved robustness against magnetic interference fields.

DETAILED DESCRIPTION OF THE DRAWINGS

Figure 1:
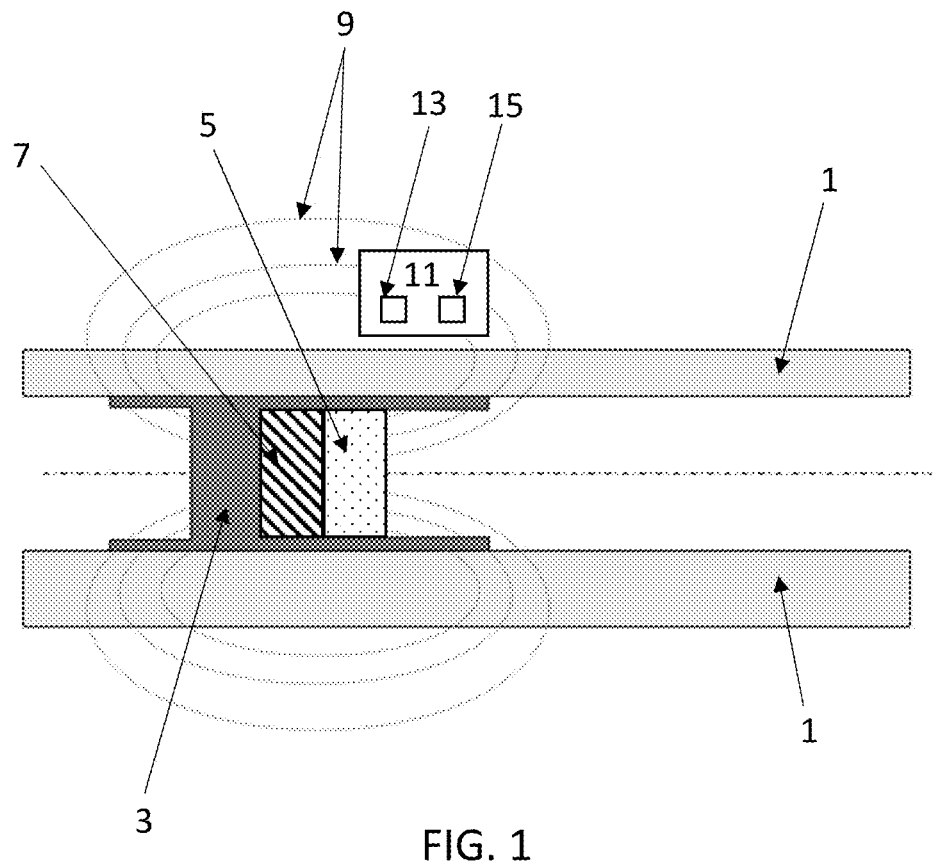
FIG. 1 shows a travel-sensing arrangement or parts of a travel-sensing arrangement according to one or more embodiments.
Figure 2:
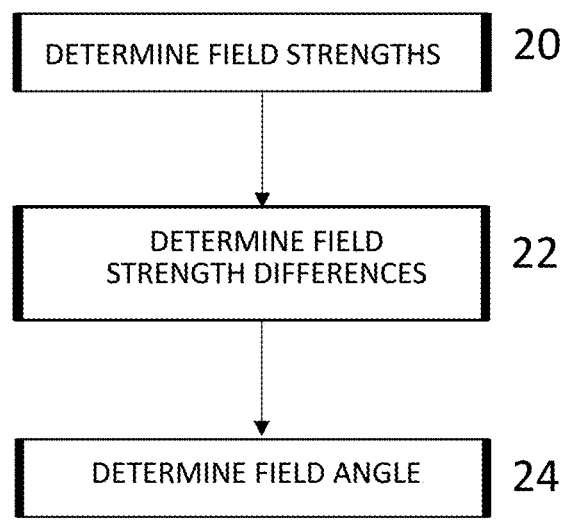
FIG. 2 shows a flow diagram relating to the method according to one or more embodiments for sensing travel.

FIG. 1 shows a travel-sensing arrangement or parts of a travel-sensing arrangement according to the invention. A cylinder 1, in particular a cylinder of a brake cylinder, and an associated piston 3, are illustrated. A permanent magnet, which comprises a north pole 5 and a south pole 7, is arranged in the piston or on the piston. Field lines 9 are generated by the poles 5, 7, wherein in FIG. 1, for example, two of these field lines are provided with the reference number 9. In addition, a sensor arrangement 11 is shown which has a first magnetic angle sensor 13 and a second magnetic angle sensor 15. The angle sensors 13, 15 are optionally embodied as 2D Hall sensors and therefore each comprise a first and a second sensing element, by which field strengths are detected in two different directions (X and Z directions). FIG. 2 shows a flow diagram relating to the method according to the invention for sensing travel.

Firstly, in step 20 a first field strength is determined in a first direction by the first sensing element of the first angle sensor 13, and a second field strength is determined in a second direction by the second sensing element of the first angle sensor 13. At the same time or at different times, a first field strength is determined in a first direction by the first sensing element of the second angle sensor 15 and a second field strength is determined in a second direction by the second sensing element of the second angle sensor 15. The two angle sensors 13, 15 therefore determine the respective field strength with their sensing elements.

Subsequently, in step 22, a difference is respectively determined between the first field strengths and between the second field strengths of the different angle sensors 13, 15. The difference between the first field strength of the first angle sensor 13 and the first field strength of the second angle sensor 15 results in a first difference field strength. The difference between the second field strength of the first angle sensor 13 and the second field strength of the second angle sensor 15 results in a second difference field strength.

Subsequently, in step 24, a field angle is calculated from the first difference field strength and the second difference field strength by the arc tangent function so that a travel-proportional output signal which is free of interference is obtained. The method therefore advantageously increases the robustness of the travel-sensing arrangement.

One or more embodiments are used in a brake system, for example in a brake system of a motor vehicle.

A method for sensing travel by a travel-sensing arrangement, wherein the travel-sensing arrangement has a first magnetic angle sensor, and the following step is carried out:
 determining a first field strength in a first direction and determining a second field strength in a second direction by the first angle sensor,
wherein the travel-sensing arrangement has a second magnetic angle sensor which is arranged at a predetermined distance from the first angle sensor, and the following step is carried out:
 determining a first field strength in a first direction and determining a second field strength in a second direction by the second angle sensor.

The embodiments make it advantageously possible to determine an interference-free or virtually interference free signal, so that the robustness of the travel-sensing arrangement with respect to interference fields is improved. A further advantage is that the sensor system can be relatively easily replaced and entails low costs.

A permanent magnet which is connected to the brake activation rod generates a magnetic field whose field vector is dependent on the position of the magnet. The angle sensors are optionally embodied as 2D Hall sensors. Therefore, the sensors respectively measure a field strength in an X direction (first field strength of the first direction) and in a Z direction (second field strength of the second direction).

In one or more embodiments, a plurality of steps are carried out for the determination of the interference-free signal. For this, a first difference field strength is calculated by forming the difference between the first field strength of the first angle sensor and the first field strength of the second angle sensor. In other words, a difference is determined between the first field strength of the first angle sensor and the first field strength of the second angle sensor, which difference is defined as the first difference field strength.

In addition, a second difference field strength is calculated by forming the difference between the second field strength of the first angle sensor and the second field strength of the second angle sensor. In other words, a difference is determined between the second field strength of the first angle sensor and the second field strength of the second angle sensor, which difference is defined as the second difference field strength.

In one or more embodiments, a field angle is subsequently calculated from the first difference field strength and the second difference field strength by the arc tangent function.

Since the two angle sensors are located at a determined, in particular fixed, distance from one another, the two sensors measure a different field angle. If a sufficiently homogeneous magnetic interference field occurs, the field strengths in the X direction (first direction) and Z direction (second direction) of the two sensors are influenced in the same way. The interference signal is eliminated by the formation of the difference between the first field strengths and between the second field strengths. A travel-proportional output signal which is free of interference is then advantageously obtained by the application of the arc tangent function to the first difference field strength and to the second distance field strength.

The invention also relates to a travel-sensing arrangement, which is optionally arranged in a brake system. The travel-sensing arrangement comprises a first angle sensor which has a first sensing element for sensing a first field strength in a first direction and a second sensing element for sensing a second field strength in a second direction, wherein the travel-sensing arrangement also has a second angle sensor which has a first sensing element for sensing a first field strength in a first direction and a second sensing element for sensing a second field strength in a second direction. Each of the two angle sensors therefore has a first and a second sensing element, wherein the sensing elements are optionally embodied as Hall elements. Each of the angle sensors is therefore optionally embodied as a 2D Hall sensor.

In one or more embodiments of the travel-sensing arrangement, said arrangement has a computing unit by which a first difference field strength between the first field strength of the first angle sensor and the first field strength of the second angle sensor can be calculated. In addition, a second difference field strength can also be calculated between the second field strength of the first angle sensor and the second field strength of the second angle sensor.

In one or more embodiments, by the computing unit, a field angle can be calculated from the first difference field strength and the second difference field strength using the arc tangent.

In one or more embodiments, the angle sensors are integrated into a brake cylinder.

Furthermore, the invention relates to a brake system having a specified travel-sensing arrangement, to a motor vehicle having such a brake system and to the use of the method and of the specified travel-sensing arrangement in a brake system.

The invention claimed is:

1. A method for sensing travel by a travel-sensing arrangement for a brake system, wherein the travel-sensing arrangement comprises a first magnetic angle sensor, and a second magnetic angle sensor arranged at a predetermined distance from the first magnetic angle sensor, the method comprising:
   determining a first field strength in a first direction and determining a second field strength in a second direction by the first magnetic angle sensor; and
   determining a third field strength in the first direction and determining a fourth field strength in the second direction by the second magnetic angle sensor,
   wherein the first magnetic angle sensor and the second magnetic angle sensor are combined into the travel-sensing arrangement, and
   wherein the first magnetic angle sensor and the second magnetic angle sensor detect a magnetic field caused by a permanent magnet connected to a brake activation rod.

2. The method as claimed in claim 1, further comprising calculating a first difference field strength by forming the difference between the first field strength of the first magnetic angle sensor and the third field strength of the second magnetic angle sensor, and
   calculating a second difference field strength by forming the difference between the second field strength of the first magnetic angle sensor and the fourth field strength of the second magnetic angle sensor.

3. The method as claimed in claim 2, further comprising calculating a field angle from the first difference field strength and the second difference field strength by an arc tangent function.

4. A travel-sensing arrangement for a brake system comprising:
   a first magnetic angle sensor comprising a first sensing element for sensing a first field strength in a first direction and a second sensing element for sensing a second field strength in a second direction; and
   a second magnetic angle sensor comprising a third sensing element for sensing a third field strength in the first direction and a fourth sensing element for sensing a fourth field strength in the second direction,
   wherein the first magnetic angle sensor and the second magnetic angle sensor are combined into the travel-sensing arrangement, and
   wherein the first magnetic angle sensor and the second magnetic angle sensor detect a magnetic field caused by a permanent magnet connected to a brake activation rod.

5. The travel-sensing arrangement as claimed in claim 4, further comprising a computing unit configured to calculate a first difference field strength between the first field strength of the first magnetic angle sensor and the third field strength of the second magnetic angle sensor and a second difference field strength between the second field strength of the first magnetic angle sensor and the fourth field strength of the second magnetic angle sensor.

6. The travel-sensing arrangement as claimed in claim 5, wherein the computing unit is configured to calculate a field angle using an arc tangent.

* * * * *